March 29, 1932.   G. H. WHITTINGHAM   1,851,227
FRICTION SWITCH FOR ELECTRIC MOTOR CIRCUITS
Filed Dec. 28, 1929
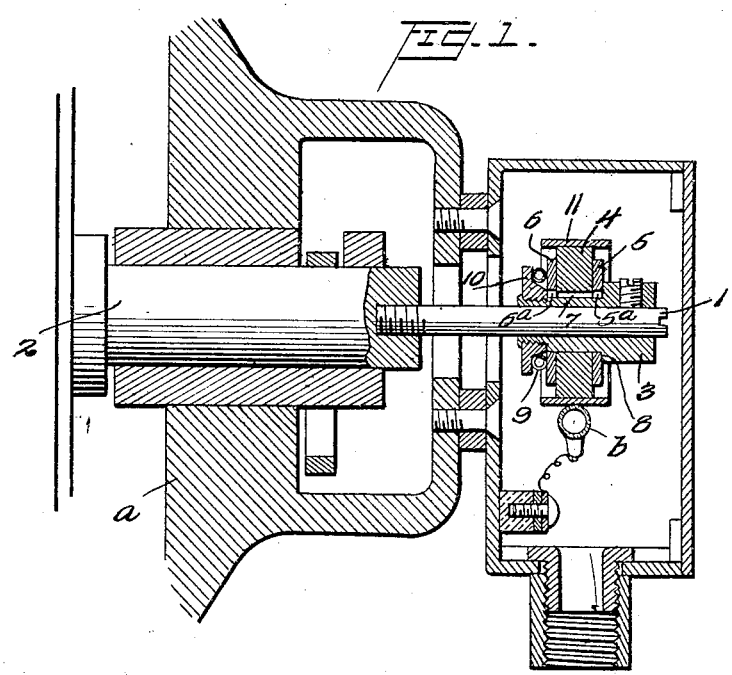
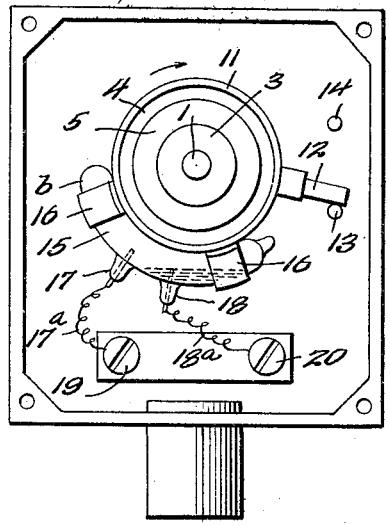
Inventor
George H. Whittingham
By Robert Watson
Attorney Patented Mar. 29, 1932

1,851,227

UNITED STATES PATENT OFFICE

GEORGE H. WHITTINGHAM, OF BALTIMORE, MARYLAND, ASSIGNOR TO MONITOR CONTROLLER COMPANY, OF BALTIMORE, MARYLAND, A CORPORATION OF MARYLAND

FRICTION SWITCH FOR ELECTRIC MOTOR CIRCUITS

Application filed December 28, 1929. Serial No. 417,188.

This invention relates to a slip switch adapted for use in connection with alternating current induction motors, to control the circuit of a magnet which operates a reverse switch for reversing the current phases in the motor to cause the motor to stop quickly after the main switch has been opened. When the motor comes to a stop and starts to reverse, the slip switch opens the circuit of the magnet controlling the reverse switch and the latter switch opens, cutting off the braking current. A switch of this character is described in my co-pending application Serial Number 365,915; filed May 25, 1929. The friction device in the present application is substantially the same as that shown in the previous application, but in the present case the circuit closing and openings means consists of a mercury switch, which is secured to the cylinder of the friction device and rocks with it about the same axis.

In the accompanying drawings,

Fig. 1 is a vertical section through a slip switch embodying my invention and through its enclosing casing and the adjacent part of an electric motor; and Fig. 2 is a front elevation of the slip switch shown in Fig. 1, the casing being shown with the cover removed.

In Fig. 1, the friction device is constructed and arranged the same as in my co-opending application hereinbefore referred to. A spindle 1 is threaded into the end of the shaft 2 of an electric motor $a$. A sleeve 3 is secured upon the spindle, and a cylinder of impregnated wood 4 is mounted so that it will turn upon the sleeve. Metal washers 5 and 6 are arranged at opposite sides of the cylinder, and these have tongues 5ª and 6ª, respectively, which enter a keyway 7 in the sleeve, so that the washers will turn with the sleeve. The washer 5 fits against a shoulder 8 on the sleeve, and an endless helical spring 9 is held against the outer side of the washer 6 by a nut 10, which is threaded on to the sleeve and which has a conical outer surface on which the spring rests. By adjusting the nut inward or outward, the spring pressure against the shoulder 6 may be varied, and the pressure of the disks against the cylinder will be varied accordingly. A metal band 11 is affixed to the periphery of the cylinder, and an arm 12 projects radially from the band and is adapted to engage fixed stops 13 and 14, which limit the movements of the cylinder and arm. With the arrangement described, when the motor is operated in one direction the arm 12 will engage the stop 14 and the washers will then slide on the cylinder, and when the motor turns in the opposite direction the cylinder will be moved, by its frictional engagement with the washers, until the arms engages the stop 13, when the movement of the cylinder will be arrested.

These limited movements of the friction device are utilized to make and break an electric circuit through the medium of a mercury switch $b$ which, in Figs. 1 and 2 of the drawings, is secured to the band surrounding the wooden cylinder. This switch comprises a curved glass tube 15, which is secured to the band 11 by metal clips 16, which extend around the ends of the tube. Wire terminals 17 and 18 extend into the tube and these are connected by flexible conductors 17ª and 18ª to stationary binding posts 19 and 20, respectively. When the motor is rotating in the direction indicated by the arrow in Fig. 2, the arm 12 rests against the stop 13, and in this position of the mercury switch the circuit is open between the terminals 17 and 18. As soon as the motor starts to operate in the reverse direction, the frictionally driven cylinder turns until the arm 12 rests against the stop 14, and in this position of the cylinder the mercury in the tube electrically connects the terminals 17 and 18.

In stopping alternating current induction motors, it is common practice to open the main switch to disconnect the motor from the supply circuit and to then close a reverse current switch which reverses the current phases in the motor and causes a dynamic braking action which quickly slows the motor down. At or before the time that the rotor of the motor comes to rest, it is necessary to open the reverse switch in order to prevent backward rotation of the motor. The reverse switch is usually closed by an electro magnet and the friction switch of my present invention is utilized to cause the opening of the circuit of this magnet as soon as the motor commences backward rotation after having been slowed down by dynamic braking.

What I claim is:

The combination with a shaft adapted to be driven by a reversible electric motor, of a device frictionally mounted on the shaft, stops arranged to limit the movement of said device with the shaft to a partial rotation, in either direction of movement of the shaft, and a mercury switch secured to said device and adapted to rock therewith about the axis of the shaft, when the direction of movement of the shaft is reversed.

In testimony whereof I affix my signature.

GEORGE H. WHITTINGHAM.